Figure 1:
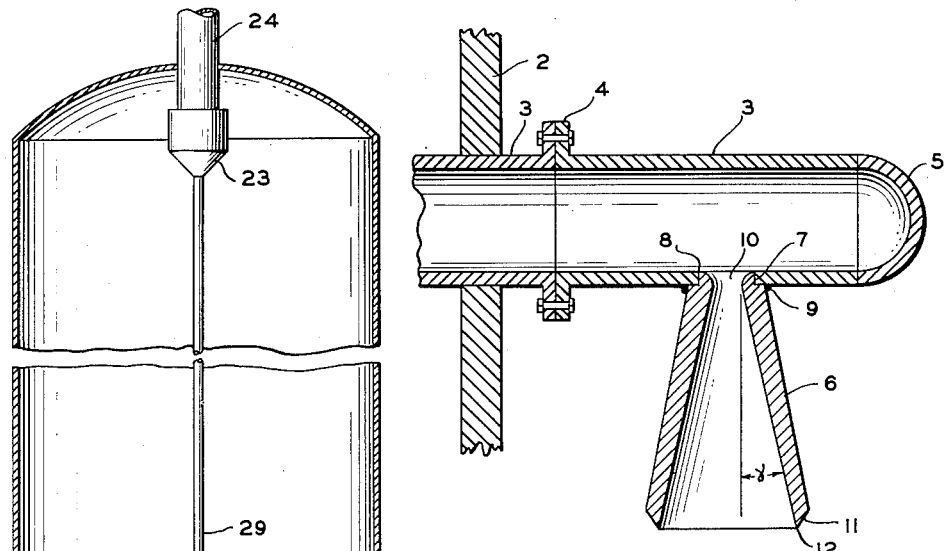

July 2, 1957  G. R. HETTICK ET AL  2,798,030
METHOD AND DEVICE FOR INJECTING A FLUID INTO
A FLUIDIZED BED OF A PARTICULATE MATERIAL
Filed March 2, 1953

INVENTORS
G. R. HETTICK
C. H. OWEN
BY
Hudson + Young
ATTORNEYS

United States Patent Office 2,798,030
Patented July 2, 1957

2,798,030

METHOD AND DEVICE FOR INJECTING A FLUID INTO A FLUIDIZED BED OF A PARTICULATE MATERIAL

George R. Hettick and Charley H. Owen, Borger, Tex., assignors to Phillips Petroleum Company, a corporation of Delaware Application March 2, 1953, Serial No. 339,642

15 Claims. (Cl. 196—52)

This invention relates to the injection of a fluid into a fluidized bed of a particulate material. In one of its aspects, this invention relates to the design of a nozzle by means of which a fluid, for example, an oil, an oil vapor, steam, or a gas, can be injected into a fluidized bed of particulate material and thoroughly disseminated therein without obtaining erosion of the said nozzle due principally to the formation of eddy currents or other phenomenon of the particulate material, for example, a hydrocarbon conversion catalyst, at the various surfaces of the nozzle parts. In another aspect of the invention it relates to the use of a specially designed injector nozzle in a process for the regeneration of spent catalyst in which a stripping fluid is injected into and commingled with a catalyst bed consisting essentially of fluidized catalyst particles for the purpose of stripping from said particles hydrocarbons associated therewith prior to regeneration of said catalyst. In a still further aspect of the invention it relates to the injection of fluids into a fluidized bed of particles, for example, catalyst particles for the purpose of operating upon or converting the said fluids. Other aspects as well as advantages of the invention are apparent from this disclosure, the accompanying drawing, and the claims.

It is known that when steam, air, or other fluids are ordinarily injected into a fluidized bed, for example, a fluidized bed as employed in a so-called fluid catalytic cracking operation, erosion is found to occur on the injection fittings or pipes which has been found to be caused by formation of eddy currents at the interface between the metal parts and the fluidized catalyst. Thus, when the injection has been accomplished employing a simple pipe inserted into the fluidized bed, the turbulence at the end of the pipe due to the sudden expansion of the injected material rapidly has eroded the end of the pipe until, indeed, it has completely disappeared as far back as the vessel wall from which the said pipe protrudes into the fluidized bed within the said vessel. When this has occurred, an extremely dangerous condition has been brought about, it being obvious that further erosion can rupture the seal between the pipe and the vessel wall thus causing leakage which can result in fire. Similar erosion problems have been observed when circular orifices have been employed. Indeed, such an orifice becomes enlarged to such an extent that it no longer acts as an orifice but rather as an open-ended pipe.

It has now been found desirable to maintain a pressure drop across a restricted opening to cause better distribution of the injected fluid within the fluidized bed and, indeed, if the injection device lacks the distributing feature, fluidized particles can sometimes back into the injection device or fitting and erode it from the inside due to the formation of a standing pressure wave within the fitting. In the prior art, injections of fluid, for example, a hydrocarbon oil vapor or steam, into a fluidized catalyst bed at injection exit velocities up to two and even four thousand feet per second through the injection orifice have been employed. It has now been found desirable to so inject the fluid into the fluidized bed that an exit velocity not substantially in excess and preferably less than about one hundred feet per second is employed.

It has been found that if the injected fluid is passed into the body of fluidized particles through a pipe and released therefrom through a tapered diffuser nozzle, eddy currents without and standing pressure waves within the injection apparatus as a whole can be substantially eliminated or avoided.

Thus, according to the invention, there is provided an injector-diffuser nozzle or device having certain characteristics described below. Also according to the invention, there are provided a process and apparatus for treatment of hydrocarbons or similar materials employing fluidized beds in which in the conversion with the catalyst or in the regeneration of the catalyst the injection of various fluids is necessary to be accomplished while avoiding erosion and other problems which have been recognized to exist.

Figure 2:
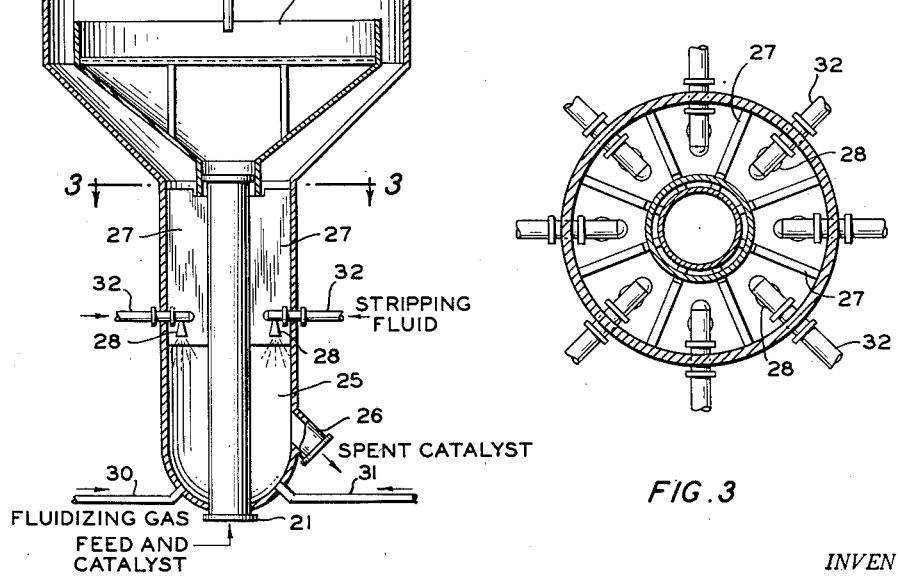
Figure 3:
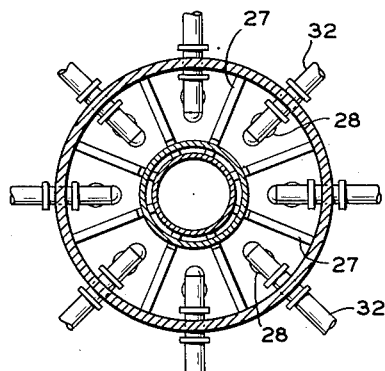

In Figure 1 there is shown in axial cross-section a nozzle device designed according to the concept of the present invention. In Figure 2 of the drawing there is shown an application of an injector-diffuser nozzle, which advantageously is designed according to the invention, in a catalyst stripping apparatus or operation also according to the invention. In Figure 3 of the drawing is shown a horizontal cross-sectional view of Figure 2 taken along line 3—3.

Referring now to Figure 1 of the drawing, 2 is a portion of a wall of a vessel containing a fluidized bed of particulate material, for example, a hydrocarbon conversion catalyst. 3 is a pipe conveying fluid to be injected into the fluidized bed through vessel wall 2. Advantageously, pipe 3 can be flanged as shown at 4. Pipe 3 is sealed at its end 5 and is equipped with at least one injector-diffuser nozzle, according to the invention, at 6. As shown in this embodiment of the invention the outer upper end of the nozzle is machined to provide a right-angular collar at 7 adapted to fit into the opening 8 in pipe 3. The nozzle is retained in the wall of pipe 3 by means of a weld 9. It will be understood by those skilled in the art that the relative diameters of pipe 3 and the upper end of the nozzle are so chosen that the ratios of curvature of the pipe 3 will be sufficiently large to allow a proper fitting of nozzle 6 into the hole or aperture cut into the wall of pipe 3. According to the invention, the length of the path of travel through the nozzle of the fluid being injected, for example, a stripping fluid or hydrocarbon vapor, will be not less than about 20 times the inside diameter of the inlet end 10 of the nozzle. The angle $\alpha$ should be within the range of from about 7 to 10°, preferably 7½ to 9°, and still more preferably 8½° providing a total angle of divergence or total included angle for the nozzle of 14–20, 15–18, and 17°, respectively. It has been found particularly important as a feature of this invention that the nozzle employed shall be bevelled or chamfered to a sharp edge as shown at 11, the sharp edge is preferably a knife edge at 12. With the foregoing nozzle, it is possible to sufficiently distribute the injected fluid at the outlet end of the nozzle as well as to sufficiently reduce its velocity at said outlet end of the nozzle to avoid eddy currents or standing pressure waves which would erode or otherwise damage the injection apparatus or device as a whole.

It will be obvious to those skilled in the art that depending upon the nozzle exit velocity desired, the angle, and the relative length of the nozzle can be varied.

Referring now to Figure 2 of the drawing, 20 is a combination hydrocarbon vapor fluidized bed catalyst converter and catalyst stripper into which hydrocarbon feed and fluidized catalyst are fed through conduit 21 and distributor 22 for conversion within the portion of vessel 20 above distributor plate 22. Converted hydrocarbon products are removed overhead through cyclone 23, and outlet conduit 24. Catalyst is withdrawn from the conversion zone of the vessel 20 and out through outlet 26 through an annular space 25 formed by inlet pipe 21 and the wall of the lower portion of vessel 20. There are radially and vertically disposed within annular space or section 25, baffles 27 (see Figure 3) and within each of the compartments thus formed within section 25 are disposed oriented in a downward direction a nozzle 28 (see Figure 3). Particles of solid entrained into cyclone 23 by fluid passing out the top of the vessel 20 are separated therefrom in cyclone 23 and returned to the bed through dip leg 29. Fluidizing gas can be introduced into the lower end of the fluidized material through conduits 30 and 31. As the catalyst passes downwardly through annular space 25, there is injected thereinto steam or other stripping fluid through pipes 32 which are equipped at their ends with injector-diffuser nozzles 28 according to this invention. By virtue of the design of the injector-diffuser nozzles of this invention and their downward orientation, the stripping fluid enters smoothly into the fluidized mass of catalyst flowing past the injectors 28.

The downward oriented discharge of the stripping fluid into the downwardly moving mass of catalyst, though smoothly accomplished, nevertheless results in better steam or stripping fluid distribution and channeling is minimized. Also not only is the erosion considerably less than heretofore but it is still considerably lessened by virtue of the fact that the velocity of the steam is more quickly reduced than heretofore because the steam must change direction for its ultimate removal through pipe 24. By tapering or chamfering the nozzles 28 within section 25, as shown in Figure 1 at 11, eddy currents in the nozzle outlet in section 25 are substantially avoided.

Reasonable variation and modification are possible within the scope of the foregoing disclosure, drawing, and the appended claims to the invention, the essence of which is that a diverging injector-diffuser nozzle, an apparatus embodying the same, and suitable for injecting fluids into fluidized beds of particulate material, and a process for employing the said apparatus for hydrocarbon conversion or catalyst regeneration have been set forth, in which the nozzle angle is in the range 7 to 10°, the length of the path of travel within the nozzle is at least about 20 times the inside diameter of its inlet and, in one embodiment thereof, the outside of the outlet end of the nozzle is chamfered to a knife edge, and in which the apparatus embodying such a nozzle in the conversion of hydrocarbons or for catalyst regeneration is so constructed and operated as to cause a reversal of flow of the fluids injected into the fluidized bed while the fluidized bed essentially travels past the nozzle in the direction in which it is oriented, and further, a method and apparatus have been set forth in which the conversion of hydrocarbons and/or the regeneration of a catalyst is accomplished employing a fluid injector oriented in the direction of flow of a fluidized mass of particulate catalyst or contact material and in which the fluid injected through said injector is caused to reverse its flow immediately upon injection.

We claim:

1. An apparatus suitable for contacting fluids with a fluidized bed of particulate solids which comprises in combination a vessel adapted to contain the said fluidized bed of particulate solids, a pipe extending through a wall of said vessel in open communication with an injector-diffuser nozzle having an axial cross-section diverging toward its exit end, the end of said pipe within said vessel being sealed, an opening in the wall of said pipe within said vessel, said opening being adapted to receive the smaller diameter end of said nozzle and to retain it in the wall of said pipe, and a fluidized bed within said vessel extending above and surrounding the exit end of said nozzle.

2. An apparatus according to claim 1 wherein the said nozzle is located within a downwardly moving mass of hydrocarbon conversion fluidized catalyst particles, is oriented in a downward direction, and wherein said vessel has a discharge for fluids at the upper end thereof, and a discharge for fluidized catalyst at the bottom end thereof.

3. An apparatus suitable for contacting fluids with a fluidized bed of particulate solids which comprises a vessel, a pipe in a wall of said vessel, for conducting fluids into the interior of said vessel; and an injector-diffuser nozzle, axially diverging from its inlet to its outlet end, having an angle of divergence in the range of 7–10° and having a length of not substantially less than about 20 times the inside diameter of the inlet end of said nozzle, attached in open communication with said pipe.

4. An apparatus according to claim 3 in which the outside of the exit end of said nozzle is chamfered to a knife edge.

5. An apparatus for treating a fluidized particulate mass of material with a fluid which comprises in combination a vessel comprising an upper portion, adapted to contain a bed of fluidized particles of said material; said vessel comprising another and lower portion; inlet means for introducing fluidized particulate material into said upper portion of said vessel; outlet means, for withdrawing fluidized material downwardly from said bed through said lower portion of said vessel; downwardly oriented fluid injector means within said lower portion adapted to introduce treating fluid into fluidized material moving downwardly through said lower portion; and outlet means at the top of said vessel for removing treating fluid therefrom.

6. An apparatus according to claim 5 wherein said inlet means passes upwardly substantially throughout the length of said lower portion and is in open communication with said upper portion, the combination of said lower portion and inlet means within said lower portion forming a withdrawal section through which fluidized material can be withdrawn from the fluidized bed in the upper portion through said section in said lower portion and from said apparatus through said outlet means in said lower portion.

7. An apparatus according to claim 6 in which at least one radially and vertically disposed baffle is placed within said section.

8. An apparatus for treating a fluidized particulate mass of material which comprises a substantially vertically disposed elongated vessel having a portion of large diameter and a portion of small diameter, the larger diameter portion being above the small diameter portion; an inlet pipe substantially concentrically arranged within said small diameter portion for feeding fluidized particulate material from without said vessel directly into said large diameter portion, thus forming an annulus within said smaller diameter portion; outlet means at the lower end of said annulus for withdrawing treated fluidized material from said vessel; fluid injector means oriented downwardly within said annulus and fluid removal means at the top of said vessel.

9. An apparatus according to claim 8 in which radially and vertically disposed baffles are placed within said annulus dividing it into a plurality of fluidized material withdrawal conduits and at least one downwardly oriented fluid injector means in each of said conduits.

10. An apparatus according to claim 8 in which the fluid injector means comprises a nozzle having an axial cross-section diverging toward its exit end, a length of not less than about 20 times the internal diameter of its inlet end and a divergence angle within the range of 7–10°.

11. An apparatus according to claim 10 in which the outside of the exit end of said nozzle is chamfered to a knife edge.

12. A method of introducing a fluid into the body of a fluidized bed of particulate material which comprises injecting said fluid into the body of said bed by discharging said fluid from a laterally confined zone located at a point within the body of said bed, said zone having a diverging cross-section in the direction and along the line of flow of said fluid.

13. The conversion of a hydrocarbon in the presence of a fluidized bed of catalyst which comprises injecting said hydrocarbon into the body of said fluidized bed of catalyst from a laterally confined zone located at a point within the body of said bed, said zone having a diverging cross-section in the direction and along the line of flow of said fluid.

14. The conversion of a hydrocarbon vapor in the presence of a fluidized bed of catalyst which comprises introducing into an upper portion of a conversion zone a fluidized mass of particles of catalyst; in said zone contacting said catalyst and said hydrocarbon so as to effect a desired conversion of said hydrocarbon; removing converted hydrocarbon from said fluidized mass of particles of catalyst at the top thereof; from said zone, from a point in the bed of said fluidized mass of particles of catalyst, passing a portion of said fluidized mass of particles of catalyst downwardly into and through another zone located substantially below said first mentioned zone; in said another zone introducing into said fluidized mass of particles of catalyst in a downwardly direction a treating fluid for stripping hydrocarbon from the catalyst particles; removing treating fluid so introduced by passing the same upwardly through said another zone and through said first mentioned zone; removing said treating fluid from the process at a point above said fluidized mass of particles of catalyst; and withdrawing thus treated fluidized catalyst particles from a lower portion of said another zone.

15. In the conversion of a hydrocarbon in the presence of a fluidized bed of catalyst in which conversion converted hydrocarbon is removed from the process at a point above said fluidized bed and in which process stripping fluid employed to strip hydrocarbon from the fluidized catalyst before it is removed from the conversion zone is also removed from the process at a point above said fluidized bed of catalyst and wherein said stripping fluid is injected directly into a lower portion of said fluidized bed of catalyst, the improvement which comprises injecting said stripping fluid downwardly into said lower portion of said fluidized bed of catalyst as it moves toward a place of discharge from said zone.

References Cited in the file of this patent

UNITED STATES PATENTS

| | | |
|---|---|---|
| 2,374,518 | Wolk et al. | Apr. 24, 1945 |
| 2,432,344 | Sinclair | Dec. 9, 1947 |
| 2,442,898 | Maguire | June 8, 1948 |
| 2,494,614 | Grote | Jan. 17, 1950 |
| 2,502,954 | Blanding | Apr. 4, 1950 |
| 2,628,158 | Wilcox | Feb. 10, 1953 |
| 2,637,633 | Strunk | May 5, 1953 |
| 2,695,265 | Degnen | Nov. 23, 1954 |